United States Patent [19]

Zaremba

[11] 4,363,614

[45] Dec. 14, 1982

[54] DUMPLING OR RAVIOLI PRESS

[76] Inventor: Tadeusz Zaremba, 2602 Haverhill, Houston, Tex. 77008

[21] Appl. No.: 264,298

[22] Filed: May 18, 1981

[51] Int. Cl.³ .................. B29C 1/00; B29C 15/00; B29C 17/10; B29C 24/00

[52] U.S. Cl. ..................... 425/298; 30/178; 249/83; 249/92; 249/170; 425/218; 425/327; 425/383; 425/442

[58] Field of Search .............. 249/170, 95, 83, 92; 425/298, 383, 218, 340, 324.1, 327, 442; 30/124, 178, 131, 134, 229; 426/92, 94, 274, 283, 297; 99/375, 380–383

[56] References Cited

U.S. PATENT DOCUMENTS

| | | | |
|---|---|---|---|
| 1,875,277 | 8/1932 | Sweeney | 99/381 |
| 2,005,010 | 6/1935 | Smith | 99/380 |
| 2,138,247 | 11/1938 | Tatosian | 99/381 |
| 2,463,439 | 3/1949 | Streitelmeier | 99/375 |
| 2,582,692 | 1/1952 | Funke | 99/381 |
| 2,780,163 | 2/1957 | Lee | 99/375 |

Primary Examiner—Willard E. Hoag
Attorney, Agent, or Firm—Neal J. Mosely

[57] ABSTRACT

A press for forming and cutting filled dough products such as dumplings and ravioli has two parts which are hinged together at one end and have handles at the other ends. The parts which are hinged together each have enlarged portions with a cavity in each fitting a like cavity in the other with cooperating cutting surfaces surrounding a major portion of each cavity for cutting a filled dough product positioned in the cavity. Each cavity opens to the rear of said enlarged portions adjacent the hinges and thus provides an opening from the cooperating cavities when said press is closed, permitting expansion of the dough product without bursting during formation thereof.

8 Claims, 3 Drawing Figures

DUMPLING OR RAVIOLI PRESS

BACKGROUND OF THE INVENTION

1. Field of the Invention

This invention relates to new and useful improvements in cutter-presses for making filled products of dough, such as ravioli or filled dumplings.

2. Brief Description of the Prior Art

Devices for rolling dough products and for forming and cutting cookies and other edible materials are well known in the art. There are many patents which are concerned with press-like devices for forming sandwiches or pies or similar products.

Sweeney U.S. Pat. No. 1,875,277 discloses a hinged product for forming a dough-like mass around a meat product such as a sausage or a frankfurter for cooking.

Smith U.S. Pat. No. 2,005,010 discloses a hand grill having two hinged components with extended handles for cooking hamburgers and the like.

Strietelmeier U.S. Pat. No. 2,463,439 discloses a hinged sandwich grill.

Funke U.S. Pat. No. 2,582,692 discloses a hinged sandwich grill.

Lee U.S. Pat. No. 2,780,163 discloses a hinged pie mold for forming filled pies.

The devices shown in these patents are all characterized by the fact that the portions of the device which enclose and form the filled product are completely closed and do not provide any opening for expansion of the product during filling. When devices of this type are applied to the formation of filled dough products such as ravioli or filled dumplings, the products usually burst open during formation and the resulting product is quite undesirable.

SUMMARY OF THE INVENTION

One of the objects of this invention is to provide a new and improved press for forming and cutting filled dough products such as dumplings and ravioli without malforming such products.

Another object of this invention is to provide a new and improved combination press and cutter for forming and cutting filled dough products having a structure permitting expansion of the filled product during forming and cutting without bursting such product.

Other objects of this invention will become apparent from time to time throughout the specification and claims as hereinafter related.

The above mentioned objects of the invention and other easily recognized objects are attained by a press for forming and cutting filled dough products such as dumplings and ravioli which has two parts hinged together at one end with handles at the other ends. The parts which are hinged together each have enlarged portions with a cavity in each fitting a like cavity in the other with cooperating cutting surfaces surrounding a major portion of each cavity for cutting a filled dough product positioned in the cavity. Each cavity opens to the rear of said enlarged portions adjacent the hinges and thus providing an opening from the cooperating cavities when said press is closed, permitting expansion of the dough product without bursting during formation thereof.

DESCRIPTION OF THE PREFERRED EMBODIMENT

Figure 1:
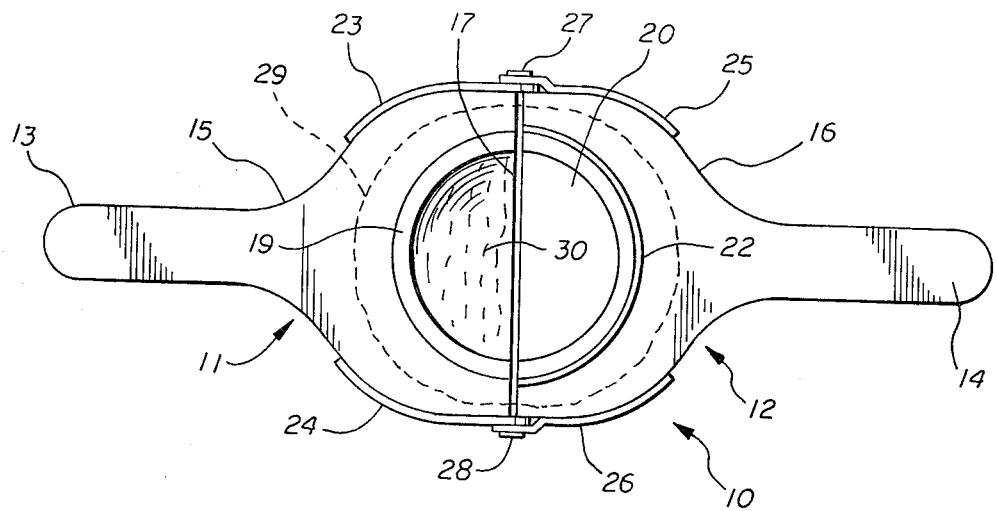
FIG. 1 of the drawing is a plan view of a preferred embodiment of a forming and cutting press for filled dough products with the components thereof in an opened position.

Referring to the drawings, there is shown a combination cutter and press 10 for forming and cutting filled dough products such as dumplings and ravioli. The cutter-press 10 comprises two parts 11 and 12. The parts 11 and 12 have handles 13 and 14, respectively, and enlarged portions 15 and 16.

Figure 3:
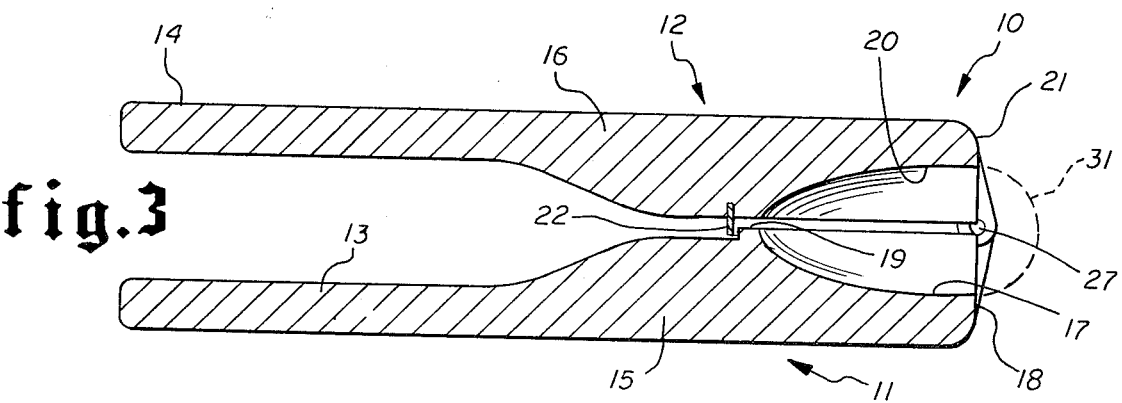
FIG. 3 is a longitudinal sectional view taken on the line 3—3 of FIG. 2 and showing a dotted line the provision for expansion of a filled dough product during use of the forming and cutting press.

Cutter part 11 has a dished out portion 17 extending to the rear end 18 thereof and being approximately semi-circular in horizontal section and semi-oval in vertical section (as seen in FIG. 3). Dished out portion 17 is surrounded by a semi-circular flange 19 extending at both sides to the end portion 18 of cutter member 11.

Cutter member 12 has a similar dished out portion 20 which extends to the rear end 21 thereof. Dished out portion 20 is semi-circular in cross section in one direction and semi-oval in cross section in the other direction in the same manner as the dished out portion 17 in cutter member 11. Cutter member 12 has a curved arcuate cutter blade 22 which is imbedded therein and has a curvature matching the curvature of flange 19 on cutter member 11 and moveable into and out of cutting or shearing relation therewith, as seen in FIGS. 1 and 3.

Cutter members 1 and 12 are hinged together on the sides of the end portions 18 and 21 thereof as seen in the various views of the drawings. Cutter member 11 has a pair of hinge plates 23 and 24 secured on opposite sides thereof which fit with matching hinge plates 25 and 26 on opposite sides of cutter member 12. These hinge plates may be secured by any suitable means including screws or rivets, adhesive or the like. Hinge plates 23 and 25 are secured together by hinge pin 27. Hinge plates 24 and 26 are similarly secured together by hinge pin 28.

Figure 2:
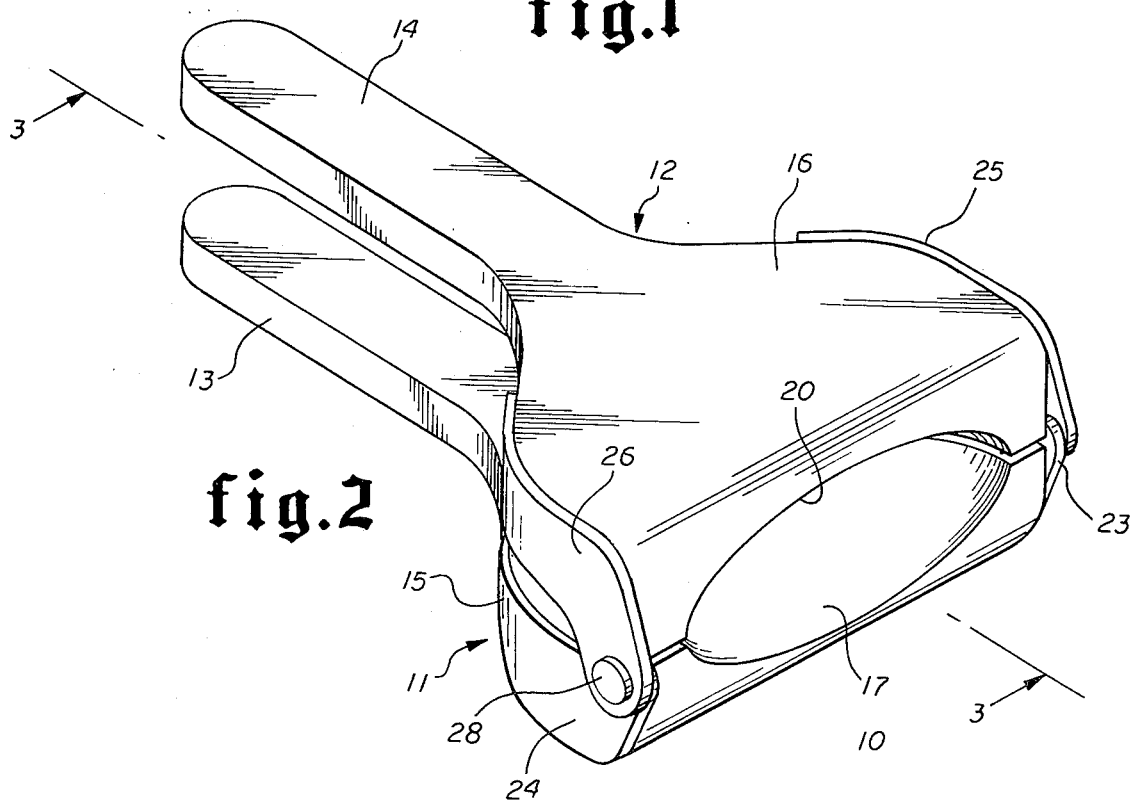
FIG. 2 is a isometric view of the press for forming and cutting filled dough products shown in FIG. 1 in a closed position.

The cutter-press is therefore comprised of cutter members 11 and 12 which are hinged together and moveable between a wide opened position as seen in FIG. 1 and a closed, cutting position as seen in FIGS. 2 and 3. The product may be made of any suitable material. An operating prototype was made of wood and metal, although a product designed for commercial manufacture might be entirely of metal or might be of molded plastic or the like with metal hinges and cutter blades.

OPERATION

In using this cutter-press, a piece of flat rolled dough is placed over the opened press as shown in dotted line 29 in FIG. 1. A suitable filling material 30 is shown in dashed line as being placed on top of the piece of dough indicated at 29 over the dished out portion 17. When handle 14 is moved relative to handle 13 to close the cutter-press 10, the dough is folded over and cutter blade 22 shears off the excess dough by movement into cutting relation with the edge of flange 19. Flange 29 also squeezes the two folded layers of dough together around the periphery thereof, except for the folded edge portion.

In earlier experimental models of the cutter-press, the rear end portion adjacent the hinges was completely closed and this structure resulted in the filling bursting the dough while the cutter-press was moved to a closed position. It was found that providing an opening at the hinged end of the cutter-press to allow for expansion of the dough product during forming and cutting prevented the product from bursting during forming. In FIG. 3, dotted line 31 illustrates the expansion of the filled product out of the rear, hinged end of the cutter-press during formation of a filled product. This cutter-press is primarily designed for filled products such as ravioli or filled dumplings having any desired type of filling. The cutter-press is inexpensive to manufacture and can be used rapidly for producing filled dough products in substantial quantity.

While this invention has been described fully and completely with emphasis upon a single preferred embodiment, it should be understood that within the scope of the appended claims the invention may be practiced otherwise than as specifically described herein.

I claim:
1. A combined press and cutter for preparation of filled dough products of the dumpling or ravioli type, comprising
   a pair of forming and cutting members having hinges interconnecting the same at one end and having operating handles at the other end for opening and closing thereof,
   each of said members having a mold cavity cooperable with the cavity on the other member and defining a cavity for a filled dough product when closed,
   each of said cavities being open to the end of said members adjacent to said hinges and providing an opening from said dough product cavity when said members are closed,
   cooperable cutting means on each of said members at the periphery of each of said cavities,
   whereby a flat or rolled dough product can be placed across both of said cavities when said members are opened, and a filling placed thereon, and closing movement of said members brings the same together to force said dough and filling into said cavities, sealing the peripheral edge thereof, and said cutting means being operable to cut the excess dough from the product, with said last named opening permitting expansion of said dough filled product to complete the forming thereof without bursting.
2. A cutter-press according to claim 1 in which
   said cutting means on each of said hinged members extends around the periphery of the mold cavity therein from one side of said end opening to the other.
3. A cutter-press according to claim 2 in which
   said cutting means on said hinged members comprises a cutting blade on one member and a cooperating cutting surface on the other member.
4. A cutter-press according to claim 3 in which
   the cavity formed when said hinged members are closed is substantially oval in lateral cross section and a half segment of an oval in longitudinal cross section, thus providing an oval shaped opening at the hinged end of said cavity for expansion of the filled dough product during formation thereof.
5. A cutter-press according to claim 3 or 4 in which
   said cutting blade is curved or arcuate in shape and recesed in one member, and
   said other member having an arcuate or curved flange closely fitting said blade when in closed position in cutting relation thereto and cooperable with the surface of said first named member adjacent to said cutting blade for pressing the peripheral edge of a filled dough product being formed therein.
6. A cutter-press according to claim 4 in which
   said members are hinged at the outer edges thereof, and
   said end opening is between said hinges at said hinged end.
7. A cutter-press according to claim 6 in which
   said hinged cutter-press members are shaped of wood.
8. A cutter-press according to claim 6 in which
   said hinged cutter-press members are formed of a molded material.

* * * * *